May 10, 1932.  C. F. RICHARDSON  1,857,607
MEANS FOR SUSPENDING A HAMMOCK
Original Filed Oct. 22, 1927  2 Sheets-Sheet 2
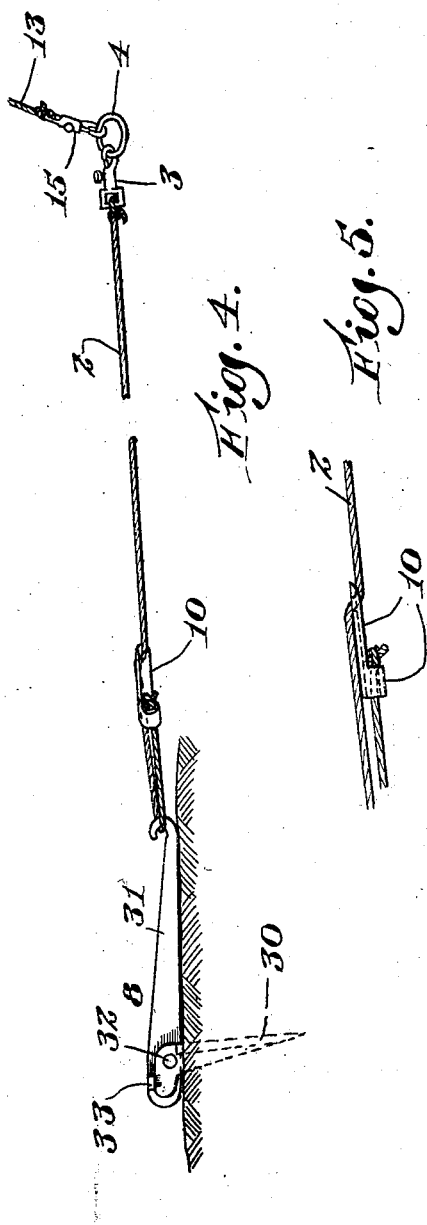
Inventor,
Charles F. Richardson Patented May 10, 1932

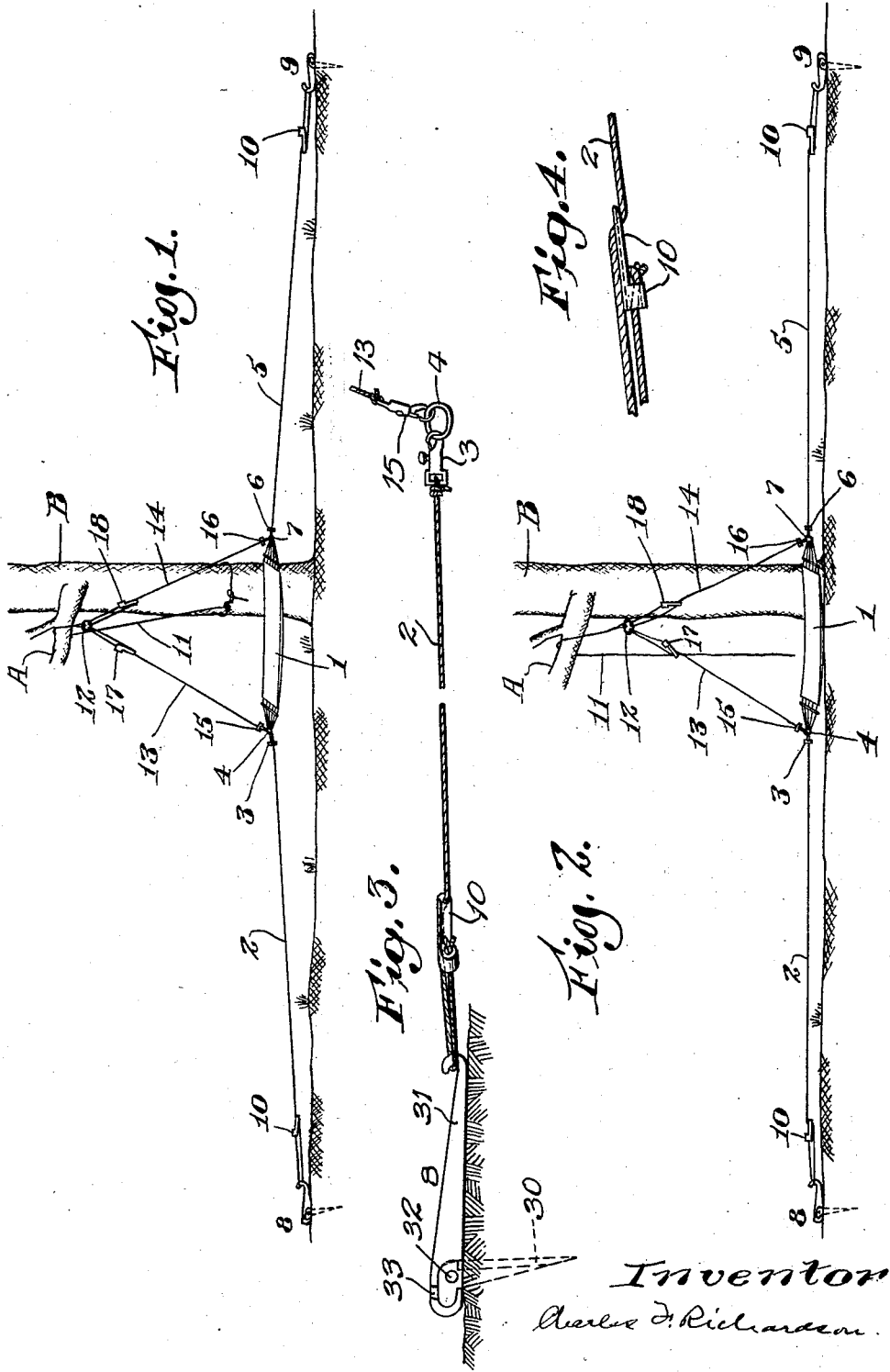

1,857,607

UNITED STATES PATENT OFFICE

CHARLES F. RICHARDSON, OF BROOKLINE, MASSACHUSETTS

MEANS FOR SUSPENDING A HAMMOCK

Application filed October 22, 1927, Serial No. 228,023. Renewed July 8, 1931.

My invention resides in new and useful means for suspending a canvas or a net hammock; and its purpose is to provide a portable bed, raised from the ground, of small compass, light in weight, strong, strung up, or taken down, easily and quickly, of simple structure, durable, and inexpensive to manufacture.

It is designed primarily for use in the country, by the army, mounted or on foot, trappers, hunters, voyageurs, boy scouts, trampers and others who must travel "light", and who, at present, at night have to lie on the ground, not because they want to, but because they have to. Sleeping bags, inflatable mattresses, and portable beds are out of the question; they are too heavy in weight, and bulky.

My invention does away with these objections, and provides the user with a bed as comfortable as the hammock commonly used on shipboard.

Broadly stated, my invention requires a single point of suspension, such, for example, as that on a suitable limb of a tree; means for holding the hammock in extended position; and means connected to the point of suspension, to hold suspended the extended hammock, free from the ground.

In the diagrammatic drawings illustrating the principles of my invention, and the best mode now known to me of embodying the same in operative structure, Fig. 1 shows a hammock suspended from a tree limb, and in extended position;

Fig. 2 shows the hammock in partially extended position on the ground, before it is raised into the operative position shown in Fig. 1;

Fig. 3 shows in enlarged fragmentary detail, the means employed for anchoring the hammock in extended position; and Fig. 4 shows a method commonly used for adjustably shortening or lengthening a stay-rope.

In describing the various embodiments of my invention, I will consider, first, that which can be used when the hammock is to hang in a vertical plane, say, at right angles to that of the limb A of a tree B, as shown in Fig. 1.

A canvas hammock 1, Fig. 2, is laid upon the ground, in said plane, its mid-portion being under the limb. An anchor-cord 2 has a snap-hook 3, Figs. 1, 2 and 3, on one end, snapped into a ring 4, on the end of the hammock. A corresponding anchor-cord 5 has a like hook 6 snapped into the opposite ring 7 of the hammock. These two cords are then drawn out their full length on the ground, in line with the hammock, and passed around foldable anchor-stakes 8 and 9, driven into the ground; said cords being drawn taut, and so held by metal slides 10, see Figs. 3 and 4, such as are commonly used for tightening tent-stays.

Next are provided, a tie-rope 11, with a ring 12, fast to one end, and two suspending cords 13 and 14, having snap-hooks 15, 16; the opposite ends being passed through the tie-rope ring 12, doubled and adjustably secured to themselves, by slides 17, 18. The hammock, now being anchored and taut, must be raised off the ground into operative position; and to accomplish this, the free end of the tie-rope 11 is passed over the limb, and pulled down, until the hammock is raised about breast high, when the tie-rope is made fast, as to the tree trunk B, Fig. 1. The hammock has become ready for use.

To take the hammock down, untie the tie-rope; the hammock drops to the ground, the tie-rope coming with it; pull up the anchor-stakes, and remove therefrom, the dirt, if any.

That my invention may be made into a small pack, carefully lay the anchor-ropes, suspending cords and tie-rope, lengthwise of the hammock, fold in the sides of the hammock, fold again, lay in the two anchor-stakes, roll or fold the hammock lengthwise, and strap into a pack, which, if proper materials have been used in constructing the invention, will be about a foot in length, eight inches in diameter, and weigh approximately eight pounds.

It will be noted from the previous descriptions and the drawings, that the anchor-ropes seem comparatively long. They are so, for the reason that the weight of the user in the hammock is such that the nearer the line of pull on the stakes is to a right angle to them in the ground, the less is the tendency of the stake to pull out; accordingly, in order to improve the anchorage, I not only make use of long anchor-cords, but also of the foldable anchor-stake 8, shown particularly in Fig. 3, and devised by me. It is composed of two members, a fluke 30, and a shank 31, pivoted at 32 and shouldered at 33, so that they may become rigid in use, but collapsible for the purpose of packing. With such an anchor-stake, and a long anchor-cord, I obtain a substantially horizontal line of pull along the cord and the shank, thereby greatly reducing the tendency of the fluke to leave the ground. An admirable anchorage is thus obtained for the hammock.

Desiring to protect my invention in the broadest manner legally possible, what I claim is:

1. A flexible hammock with a ring at each end; two anchor-cords, one attached to each hammock ring, while the free end of each cord is adapted to be anchored to the ground; two suspending cords, one cord attached to each hammock ring, while the free ends of the suspending cords are attached to a suspending ring; and means for securing said suspending ring to a fixed point of suspension above said hammock, for the purpose of suspending said hammock from said fixed point.

2. A flexible hammock with a ring at each end; two anchor-cords, one attached to each hammock ring, while the free end of each cord is adapted to be anchored to the ground; two suspending cords, one cord attached to each hammock ring, while the free ends of the suspending cords are attached to a suspending ring; and a tie cord attached to the suspending ring to pass over said point of suspension to render and hold taut said anchor-cord, suspension cords and hammock.

3. A flexible hammock with a ring at each end; two anchor-cords, one attached to each hammock ring, while the free end of each cord is adapted to be anchored to the ground; two suspending cords, one cord attached to each hammock ring, while the free ends of the suspending cords are attached to a suspending ring; a tie cord attached to the suspending ring to pass over a point of suspension to render and hold taut said anchor-cords, suspension cords and hammock; metallic snap hooks being employed to connect said cords to said rings; and means for varying the operative lengths of said cords.

In testimony whereof I hereunto affix my signature.

CHARLES F. RICHARDSON.